US011422877B2

(12) United States Patent
Takeuchi

(10) Patent No.: US 11,422,877 B2
(45) Date of Patent: Aug. 23, 2022

(54) INFORMATION PROCESSING APPARATUS, METHOD, AND NON-TRANSITORY COMPUTER-READABLE STORAGE MEDIUM FOR STORING CONTROL PROGRAM OF INFORMATION PROCESSING APPARATUS

(71) Applicant: FUJITSU LIMITED, Kawasaki (JP)

(72) Inventor: Tamotsu Takeuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 234 days.

(21) Appl. No.: 16/932,885

(22) Filed: Jul. 20, 2020

(65) Prior Publication Data

US 2021/0026726 A1 Jan. 28, 2021

(30) Foreign Application Priority Data

Jul. 26, 2019 (JP) .............................. JP2019-138029

(51) Int. Cl.
 *G06F 11/00* (2006.01)
 *G06F 11/07* (2006.01)
 *G06F 9/38* (2018.01)

(52) U.S. Cl.
 CPC ........ *G06F 11/0772* (2013.01); *G06F 9/3836* (2013.01); *G06F 11/0721* (2013.01)

(58) Field of Classification Search
 CPC .. G06F 11/0793; G06F 11/3058; G06F 11/20; G06F 11/2041; G06F 11/0721
 See application file for complete search history.

(56) References Cited

U.S. PATENT DOCUMENTS

| 5,153,881 | A | 10/1992 | Bruckert et al. |
| 6,618,805 | B1 * | 9/2003 | Kampe ............... G06F 11/1433 713/1 |
| 6,681,282 | B1 * | 1/2004 | Golden .................. H04L 69/40 710/302 |
| 6,973,517 | B1 * | 12/2005 | Golden .................. G06F 15/16 710/302 |
| 9,542,282 | B2 * | 1/2017 | Chen .................... G06F 11/1484 |
| 2018/0181474 | A1 * | 6/2018 | DeHaemer .......... G06F 11/2043 |

FOREIGN PATENT DOCUMENTS

| JP | H03-182939 A | 8/1991 |
| JP | 2004-054616 A | 2/2004 |

* cited by examiner

*Primary Examiner* — Charles Ehne
(74) *Attorney, Agent, or Firm* — Fujitsu Patent Center

(57) ABSTRACT

A method implemented by a computer including a plurality of components, each of the plurality of components including a processor configured to output an error notification after detecting an error, the method includes: executing a first processing when the error notification is received from an error detected processor, the first processing including specifying an error component by analyzing error information from the error detected processor; executing a second processing to issue a request for active exchange when another component able to be actively exchanged with the error component exists; executing a third processing to issue instructions in response to detecting that the operating system is alive after the issuing of the request, the instructions including a deletion instruction and an addition instruction, the deletion instruction being configured to execute active deletion processing of the error component, the addition instruction being configured to execute active addition processing of the other component.

17 Claims, 9 Drawing Sheets

INFORMATION PROCESSING APPARATUS, METHOD, AND NON-TRANSITORY COMPUTER-READABLE STORAGE MEDIUM FOR STORING CONTROL PROGRAM OF INFORMATION PROCESSING APPARATUS

CROSS-REFERENCE TO RELATED APPLICATION

This application is based upon and claims the benefit of priority of the prior Japanese Patent Application No. 2019-138029, filed on Jul. 26, 2019, the entire contents of which are incorporated herein by reference.

FIELD

The embodiment discussed herein is related to an information processing apparatus, a method, and a non-transitory computer-readable storage medium storing a control program of the information processing apparatus.

BACKGROUND

In an information processing apparatus including a plurality of processors, in a case where an error of the processor occurs, it is possible to suppress that an error occurs again after the occurrence of the error by not using the processor in which the error has occurred. Furthermore, in the information processing apparatus, in a case where normal operation firmware is not normally activated, the firmware is restored without using manpower by activating firmware for restoration.

Examples of the related art include Japanese Laid-open Patent Publication No. 03-182939, and Japanese Laid-open Patent Publication No. 2004-54616.

SUMMARY

According to an aspect of the embodiments, a method implemented by a computer, the computer including a plurality of components, each of the plurality of components including a processor configured to output an error notification in response to detecting an error, the method includes: executing an error specification processing when the error notification is received from an error detected processor which has detected an error occurred, the error detected processor being the processor included in any of the plurality of components, the error specification processing including specifying an error component by analyzing error information obtained from the error detected processor, the error component being any of the plurality of components and including a part that causes an error; executing an exchange determination processing that includes issuing a request for active exchange when another component exists from among the plurality of components, the other component being a component able to be actively exchanged with the error component; executing an existence monitoring processing that includes monitoring whether or not an operating system executed by the information processing apparatus is alive, and issuing instructions in response to detecting that the operating system is alive after the issuing of the request for active exchange, the instructions including a deletion instruction and an addition instruction, the deletion instruction being configured to execute active deletion processing of the error component, the addition instruction being configured to execute active addition processing of the other component; and executing an active exchange processing that includes initiating the active deletion processing in response to the deletion instruction issued from the existence monitoring processing, and initiating the active addition processing in response to the active addition instruction issued from the existence monitoring processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

In a case where use of a processor in which an error has occurred is stopped, processing performance of an information processing apparatus is deteriorated. Furthermore, for example, in a case where the error occurs in the processor due to intermittent short circuit of a power supply, even when the use of the processor is stopped, the cause of the error is not removed.

For example, in the information processing apparatus including a plurality of components each including a processor and a management unit that manages the plurality of components, it is assumed that a component having a failure be actively exchanged with another component. In this case, firmware executed by the management unit and an operating system (hereinafter, referred to as OS) executed by the processor execute active exchange processing in cooperation with each other on the basis of an error notification from the processor.

For example, in a case where recovery processing executed by the OS on the basis of the error notification from the processor is not successfully executed and the OS hangs up, it is difficult to execute the active exchange processing by the firmware and the OS in cooperation with each other. However, even in a case where the OS hangs up on the basis of the error notification from the processor, the firmware does not recognize that the OS hangs up. Therefore, the firmware tries to execute the active exchange processing in cooperation with the OS. Then, the active exchange processing fails. By adding a function to the OS, the firmware can determine whether or not the OS is operating before the active exchange processing is started. However, it is difficult to add the function of the OS by a vendor of the information processing apparatus.

In an aspect of this disclosure, provided is a solution to monitor an operation state of an OS without adding a function to the OS and actively exchange a component having a failure with another component.

In one aspect, the present embodiment can monitor an operation state of an OS without adding a function to the OS and actively exchange a component having a failure with another component.

Hereinafter, embodiments will be described with reference to the drawings.

Figure 1:
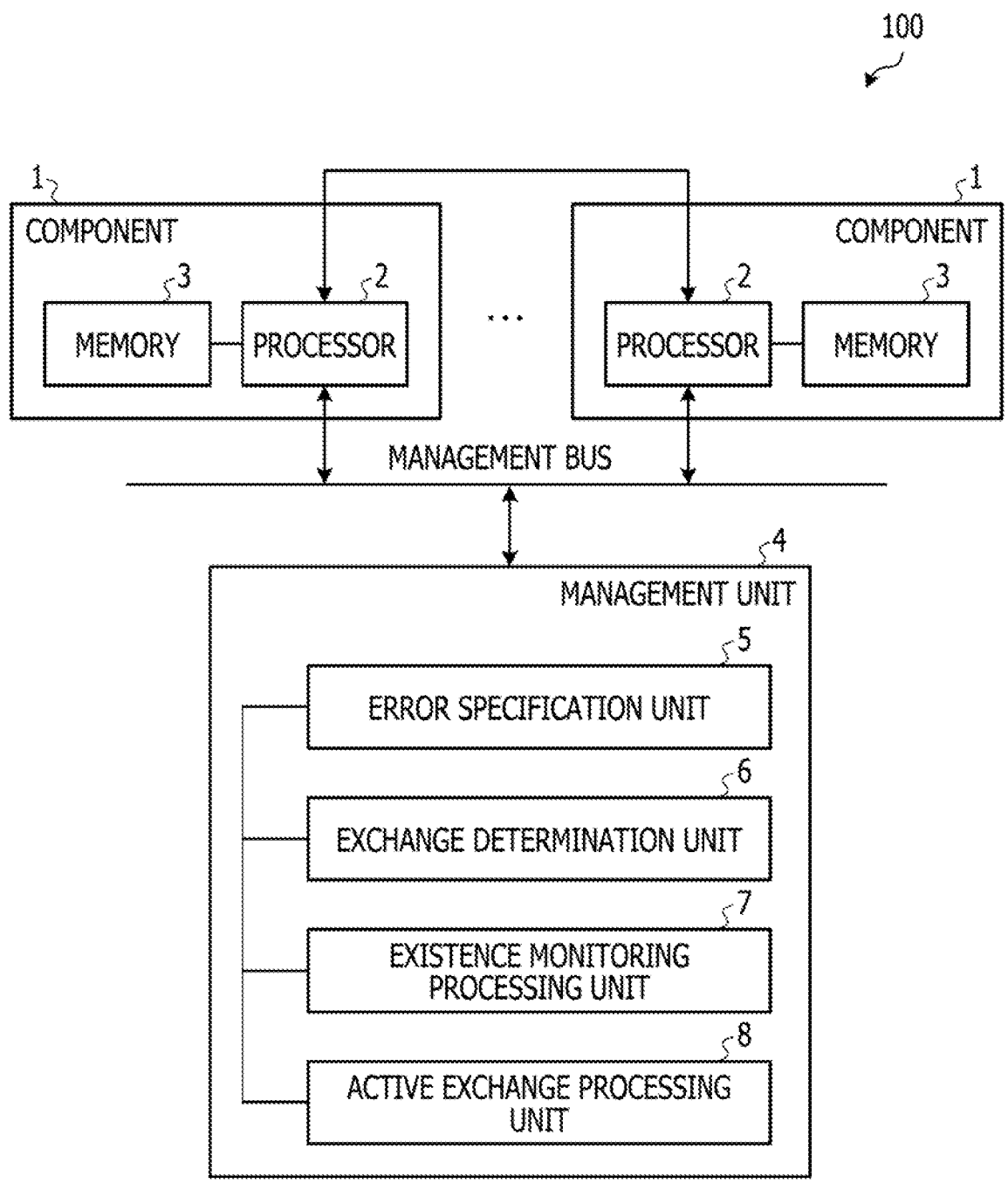
FIG. 1 is a block diagram illustrating an example of an information processing apparatus according to an embodiment.

FIG. 1 illustrates an example of an information processing apparatus 100 according to an embodiment. The information processing apparatus 100 includes a plurality of components 1 each including a processor 2 and a memory 3 and a management unit 4 that manages the components 1. For example, the component 1 has a form of a system substrate. The processor 2 may be a Central Processing Unit (CPU) or a processor other than the CPU. For example, the processors 2 are mutually connected by Quick Path Interconnect (QPI) or Ultra Path Interconnect (UPI). The processors 2 and the management unit 4 are mutually connected via a management bus.

The management unit 4 includes an error specification unit 5, an exchange determination unit 6, an existence monitoring processing unit 7, and an active exchange processing unit 8. The management unit 4 may be realized by hardware or may be realized by a management program executed by a management processor (not illustrated) included in the management unit 4.

For example, in a case of receiving an error notification from any one of the processors 2 via the management bus, the error specification unit 5 reads error information held by a status register or the like of the processor 2 that has output the error notification and analyzes the read error information. The error specification unit 5 specifies an error component 1 that is a component 1 including a part that causes an error, on the basis of the analysis result of the error information. For example, the error component 1 is identified by using an identification number of the error component 1 or an identification number of the processor 2 included in the error component 1.

In a case of detecting an access error of the memory 3, an access error of an Input/Output (I/O) which is not illustrated, a communication error with another processor 2, or the like, each processor 2 stores error information indicating the detected error in an error status register. Then, each processor 2 issues the error notification to the management unit 4 via an error pin or the like. There is a case where an error is caused by a failure of a part in the component 1 including the processor 2 that has detected the error or a case where an error is caused by a failure of a part in another component 1 connected to the processor 2 that has detected the error.

Note that the error notification is notified to an OS executed by the processor 2 of each component 1. The OS that has received the error notification reads the error information held by the status register or the like of the component 1 that has output the error notification and analyzes the read error information. Then, the OS executes recovery processing.

In a case where the recovery processing is successfully executed, the OS continues to operate and regularly issues an existence monitoring notification such as a watchdog timer command. The existence monitoring notification indicates that the OS is operating. On the other hand, in a case where the recovery processing fails, the OS executes restart processing of the component 1. In a case where the component 1 is not restarted, the OS hangs up. In a case where the OS hangs up, the issuance of the existence monitoring notification is stopped.

The exchange determination unit 6 determines whether or not the other component 1 that can be exchanged with the error component 1 exists. In a case where the other component 1 that can be exchanged with the error component 1 exists, the exchange determination unit 6 issues a request for active exchange. Here, the active exchange indicates that any one of the components 1 is stopped in a state of being turned on and the other component 1 is started instead of the stopped component 1. The active exchange processing is executed by the management unit 4 and the OS in cooperation with each other.

For example, the exchange determination unit 6 determines whether or not a component 1 exists that has a configuration similar to that of the error component 1 among the plurality of error components 1 included in the information processing apparatus 100 and is not used. The exchange determination unit 6 acquires specification information indicating a specification of the processor 2 included in the component 1 that is not used via the management bus and compares the acquired specification information and specification information of the processor 2 included in the error component 1. For example, the specification information includes information regarding a type and an operation frequency of the processor 2.

Then, in a case where the acquired specification information is the same or equivalent to the specification information of the processor 2 included in the error component 1, the exchange determination unit 6 determines that the other component 1 that can be exchanged with the error component 1 exists and issues the request for active exchange. By determining whether or not a component 1 which can be actively added exists on the basis of the specification information the unused processor 2 acquired via the management bus, processing performance of the information processing apparatus 100 after the active exchange can be equivalent to that before the active exchange. With this operation, it is possible to suppress occurrence of a processing delay or the like after the active exchange, and it is possible to minimize an influence of the failure of the component 1 on the processing of the information processing apparatus 100.

The existence monitoring processing unit 7 monitors the existence of the OS. For example, the existence monitoring processing unit 7 repeats an operation for resetting a timer (not illustrated) each time when the existence monitoring notification is received. The existence monitoring processing unit 7 detects, from a timeout of the timer, that the recovery processing executed by the OS on the basis of the occurrence of the error fails and the OS does not normally operate. Note that, in a case where an existence monitoring function can be switched to valid or invalid, the existence monitoring function is set to be valid.

In a case where the exchange determination unit 6 has issued the request for active exchange and the existence of the OS has been confirmed, the existence monitoring processing unit 7 issues instructions to execute active deletion processing of the error component 1 and active addition processing of the other component 1 that can be exchanged with the error component 1. On the other hand, in a case where the existence of the OS is not recognized, even in a case where the exchange determination unit 6 has issued the request for active exchange, the existence monitoring processing unit 7 suppresses the issuance of the instructions to execute the active deletion processing and the active addition processing. With this operation, in a case where the OS does not normally operate, it is possible to suppress a failure in advance such that the active deletion processing and the active addition processing executed by the OS and the management unit 4 in cooperation with each other are not completed.

The active exchange processing unit 8 starts the active deletion processing on the error component 1 and the active addition processing on the other component 1 that is not used on the basis of the instructions to execute the active deletion processing and the active addition processing from the existence monitoring processing unit 7. At this time, the active exchange processing unit 8 executes active exchange processing in cooperation with the OS. Since the active exchange processing is executed on the basis of the confirmation of the existence of the OS by the existence monitoring processing unit 7, the cooperation with the OS is not stopped after the active exchange processing is started.

Note that, in a case where the exchange determination unit 6 determines that active exchange is performed on the component 1 that is assumed to have a failure on the basis of the analysis result of the error information read by the error specification unit 5, the exchange determination unit 6 may determine whether or not the error occurs again during the active exchange. For example, the exchange determination unit 6 may determine whether or not content of the error notification indicates a fatal error that is not resolved by actively exchanging the component 1. In a case where the exchange determination unit 6 determines that the error is a fatal error, the exchange determination unit 6 does not issue the request for active exchange to the existence monitoring processing unit 7 even in a case where the other component 1 that can be exchanged with the error component 1 exists.

As described above, in a case where the active exchange is performed on the component 1 on the basis of the failure of any one of the components 1, the management unit 4 can determine whether or not active exchange can be performed. For example, the management unit 4 can automatically specify the error component 1 that is actively deleted and determines whether or not the component 1 exists that is a target of the active addition and that is not used. Furthermore, the management unit 4 can automatically determine whether or not an error occurs again during the active exchange.

With this operation, it is possible to actively exchange the component 1 without performing an operation by a user or the like who use the information processing apparatus 100. Furthermore, a mechanism that automatically performs the active exchange can be realized without changing the function of the OS. Moreover, by using the existence monitoring function of the OS, it is possible to suppress, in advance, the failure such that the active exchange of the component 1 is not completed because the OS does not exist.

Figure 2:
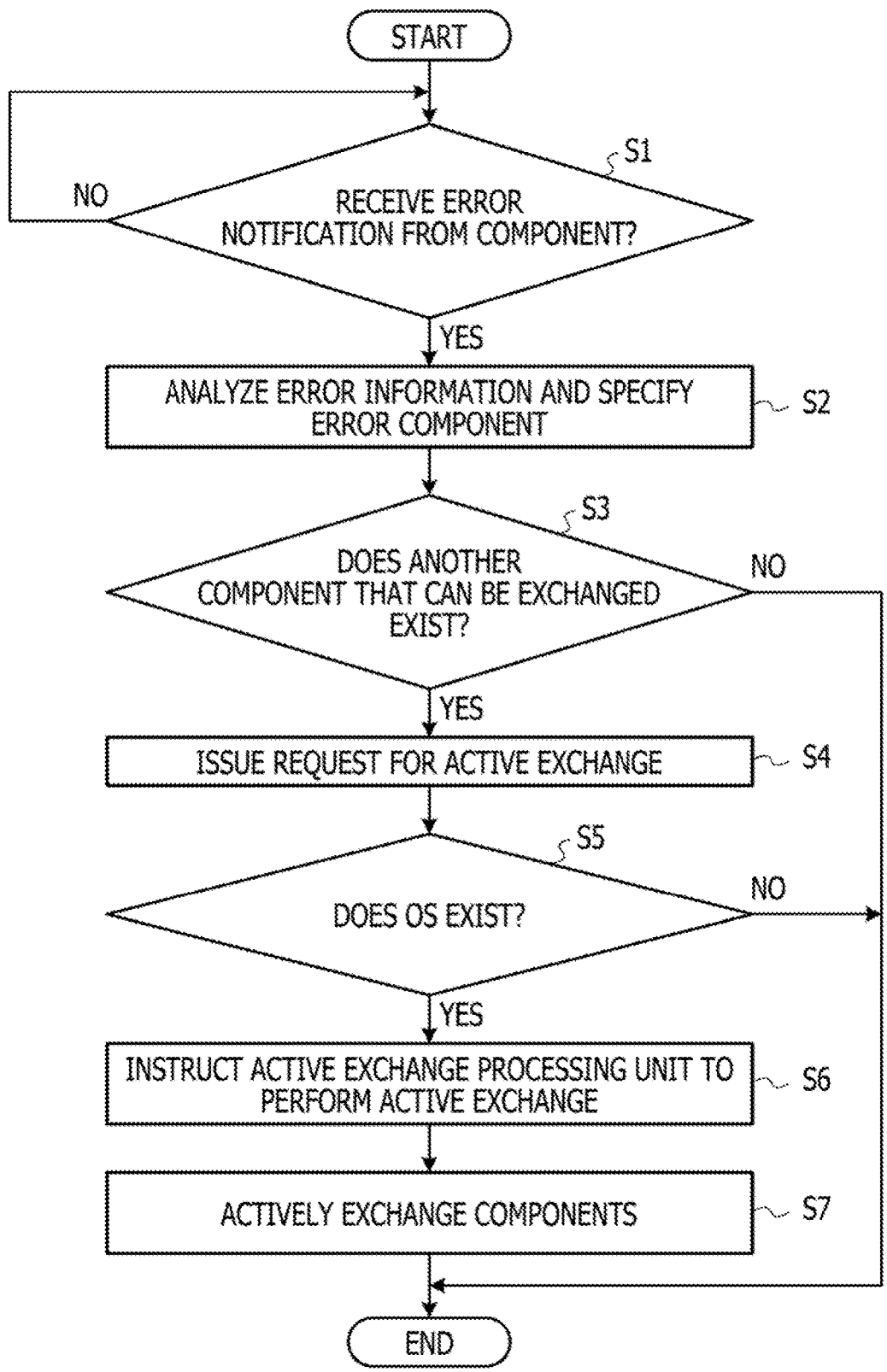
FIG. 2 is a flowchart illustrating an example of processing for actively exchanging components in a management unit in FIG. 1.

FIG. 2 illustrating an example of processing for actively exchanging the component 1 by the management unit 4 in FIG. 1. For example, the processing in FIG. 2 is realized by executing a control program for active exchange by the management processor included in the management unit 4. For example, FIG. 2 illustrates an example of the control program of the information processing apparatus 100.

First, in step S1, the error specification unit 5 waits until the error notification is received from the component 1. In a case where the error notification is received, the processing proceeds to step S2. In step S2, the error specification unit 5 reads the error information held by the status register or the like of the processor 2 that has output the error notification, analyzes the read error information, and specifies the error component 1.

Next, in step S3, the exchange determination unit 6 determines whether or not the other component 1 that can be exchanged with the error component 1 exists. In a case where the other component 1 that can be exchanged with the error component 1 exists, the processing proceeds to step S4. In a case where the other component 1 that can be exchanged with the error component 1 does not exist, the processing is terminated.

Note that, in a case of determining that the error is a fatal error that is not resolved by actively exchanging the component 1, the exchange determination unit 6 may terminate the processing even in a case where the other component 1 that can be exchanged with the error component 1 exists. In step S4, the exchange determination unit 6 issues the request for active exchange of the component 1 to the existence monitoring processing unit 7.

Next, in step S5, the existence monitoring processing unit 7 determines whether or not the OS exists. In a case where the OS exists, the existence monitoring processing unit 7 proceeds the processing to step S6. In a case where the OS does not exist, the existence monitoring processing unit 7 terminates the processing. In step S6, the existence monitoring processing unit 7 instructs the active exchange processing unit 8 to perform the active exchange.

Next, in step S7, the active exchange processing unit 8 executes the active deletion processing on the error component 1 and the active addition processing of the other component 1 that is not used on the basis of the instructions to execute the active deletion processing and the active addition processing from the existence monitoring processing unit 7 and terminates the processing. The active deletion processing and the active addition processing are executed together with the OS.

Figure 3:
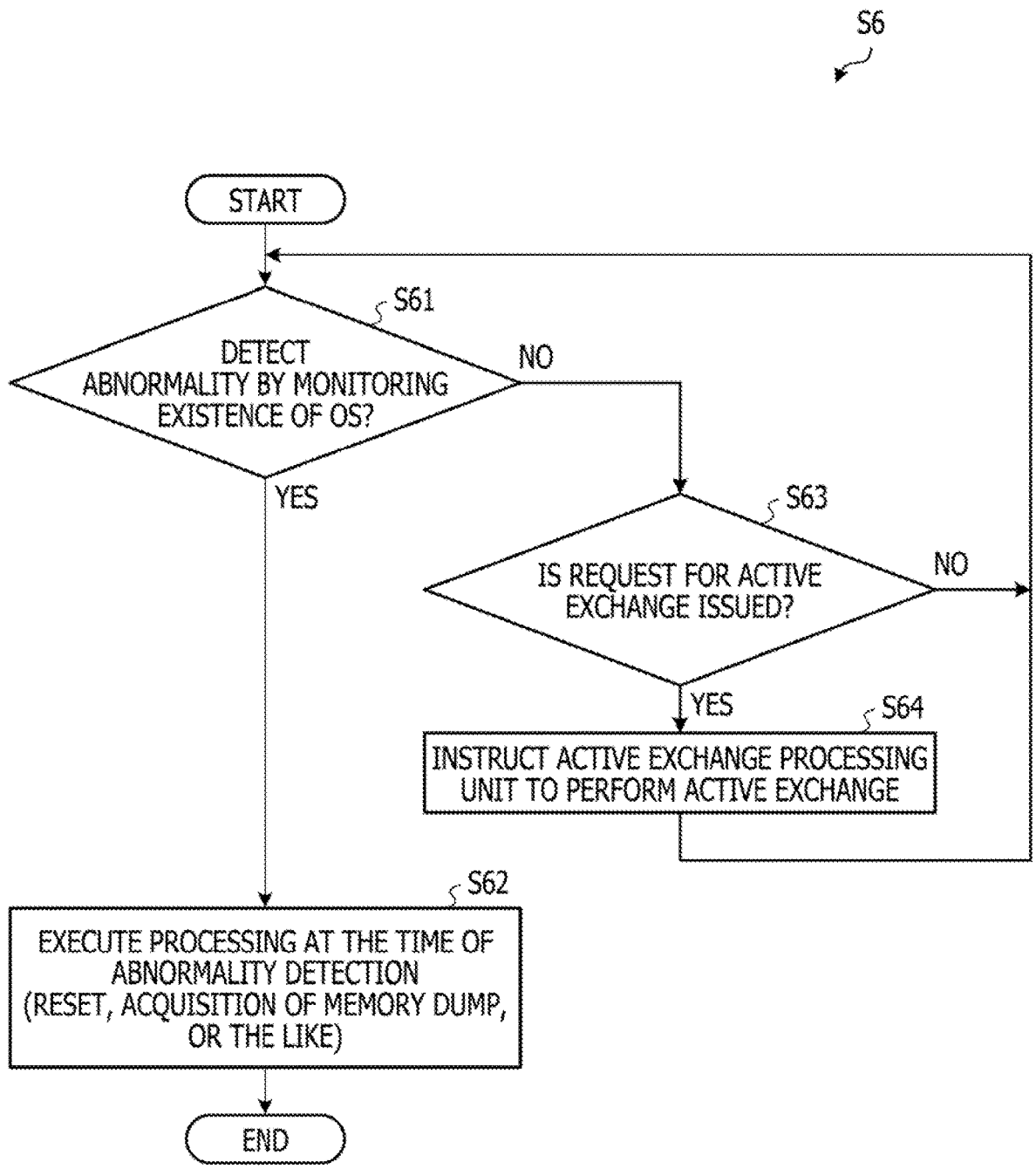
FIG. 3 is a flowchart illustrating an example of processing in step S6 in FIG. 2.

FIG. 3 illustrates an example of the processing in step S6 in FIG. 2. First, in a case where the existence monitoring processing unit 7 detects, in step S61, an abnormality in the OS existence monitoring, the existence monitoring processing unit 7 proceeds the processing to step S62. In a case where the abnormality is not detected in the OS existence monitoring, the existence monitoring processing unit 7 proceeds the processing to step S63.

In step S62, the existence monitoring processing unit 7 executes processing at the time of abnormality detection that is executed when the OS does not exist, and terminates the processing. For example, the processing at the time when the abnormality is detected includes reset of the processor 2, acquisition of a memory dump that transfers information held in a memory region used by the OS to a hard disk or the like, or the like.

On the other hand, in a case where the abnormality is not detected in the OS existence monitoring, the existence monitoring processing unit 7 determines in step S63 whether or not the request for active exchange is issued by the exchange determination unit 6. In a case where the request for active exchange is issued, the existence monitoring processing unit 7 proceeds the processing to step S64. In a case where the request for active exchange is not issued, the existence monitoring processing unit 7 returns the processing to step S61. In step S64, the existence monitoring processing unit 7 instructs the active exchange processing unit 8 to actively exchange the component 1 and returns the processing to step S61.

As described above, in the embodiment illustrated in FIGS. 1 to 3, the management unit 4 determines whether or not the active exchange can be performed on the basis of the failure of any one of the components 1, and it is possible to automatically perform the active exchange without using manpower. Furthermore, a mechanism that automatically performs the active exchange can be realized without changing the function of the OS. Moreover, by using the existence monitoring function of the OS, it is possible to suppress, in advance, the failure such that the active exchange of the component 1 is not completed because the OS does not exist. Therefore, if the OS has the existence monitoring function, it is possible to realize an active exchange function according to the present embodiment without changing the function of the OS.

Furthermore, it is determined whether or not the error occurs again during the active exchange, and in a case where it is determined that the error occurs again, it is possible to suppress the execution of the active exchange. Therefore, it is possible to suppress that the error occurs again after the active exchange and it is difficult to continue the operation of the information processing apparatus 100, and it is possible to stably operate the information processing apparatus 100.

By acquiring the specification information of the processor 2 that is not used via the management bus, the error component 1 can be actively exchanged with a component 1 having equivalent performance. With this operation, it is possible to suppress occurrence of a processing delay or the like after the active exchange, and it is possible to minimize an influence of the failure of the component 1 on the processing of the information processing apparatus 100.

Figure 4:
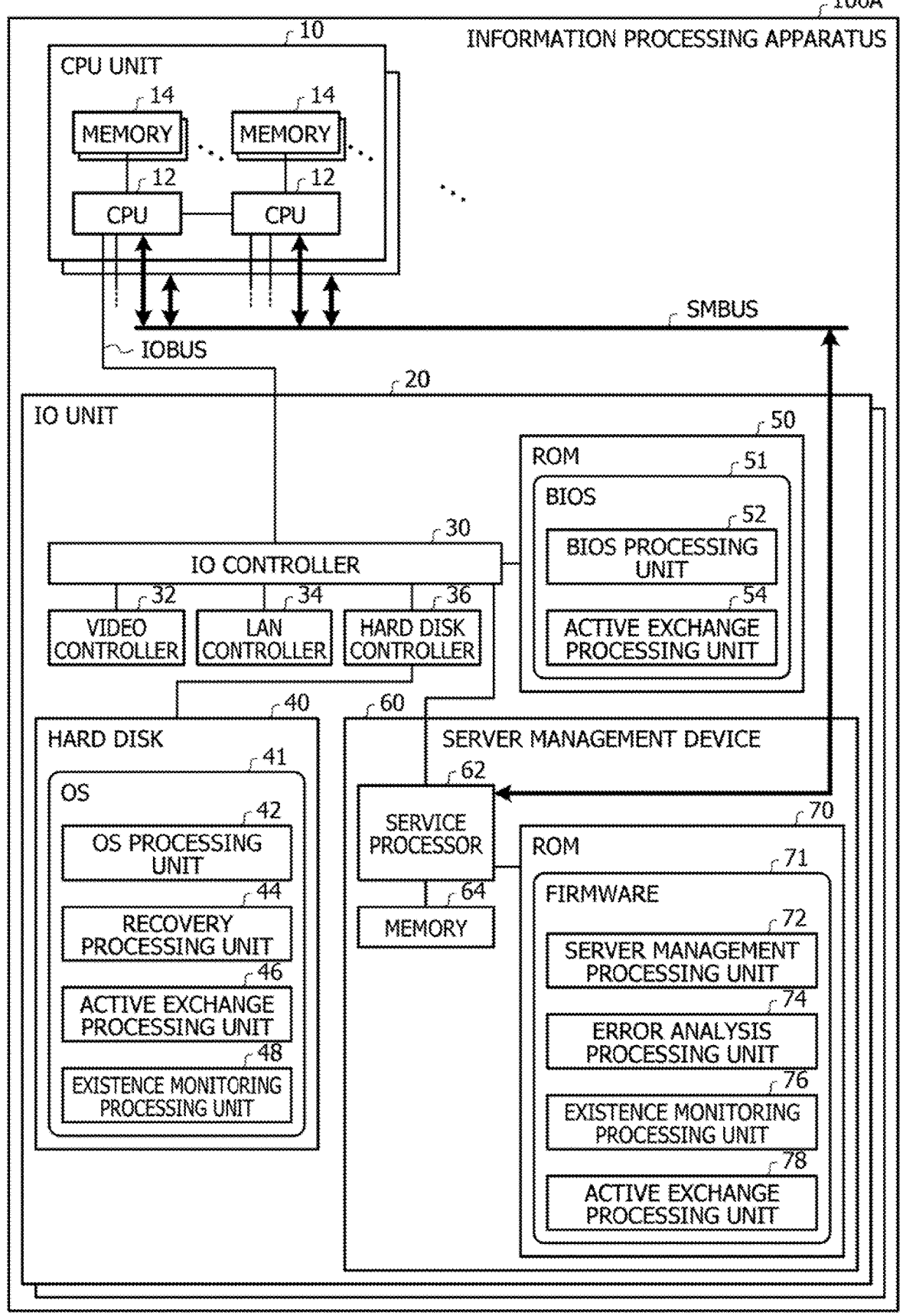
FIG. 4 is a block diagram illustrating an example of an information processing apparatus according to another embodiment.

FIG. 4 illustrates an example of an information processing apparatus 100A according to another embodiment. Detailed description on the elements similar to those in FIG. 1 is omitted. For example, the information processing apparatus 100A illustrated in FIG. 4 is a server in which a general-purpose CPU is mounted.

The information processing apparatus 100A includes a plurality of CPU units 10 and at least a single IO unit 20. The IO unit 20 is an example of an input and output unit. Each CPU unit 10 includes a plurality of CPUs 12 and a plurality of memories 14 respectively connected to the CPUs 12. For example, the CPU unit 10 has a form of a system substrate. For example, the memory 14 is a memory module including a Synchronous Dynamic Random Access Memory (SDRAM). The CPU unit 10 is an example of a component.

The IO unit 20 includes an IO controller 30, a video controller 32, a Local Area Network (LAN) controller 34, a hard disk controller 36, a hard disk 40, a Read Only Memory (ROM) 50, and a server management device 60. The IO controller 30, the video controller 32, the LAN controller 34, and the hard disk controller 36 are examples of an input and output interface. The ROM 50 is an example of a storage device.

The IO controller 30 is connected to each CPU 12 via an input and output bus IOBUS. The TO controller 30 controls information transfer between each CPU 12 and the video controller 32, the LAN controller 34, the hard disk controller 36, the ROM 50, and a service processor 62. In FIG. 4, the single CPU 12 is connected to the IO controller 30. However, each CPU 12 can be connected to any IO unit 20 or a Peripheral Component Interconnect (PCI) unit (not illustrated). Note that the TO controller 30 may be connected to a controller other than the video controller 32 and the LAN controller 34.

The hard disk 40 stores an OS 41 that functions as an OS processing unit 42, a recovery processing unit 44, an active exchange processing unit 46, and an existence monitoring processing unit 48. The OS 41 is developed from the hard disk 40 into the memory 14, and then, is executed by the CPU 12.

Figure 5:
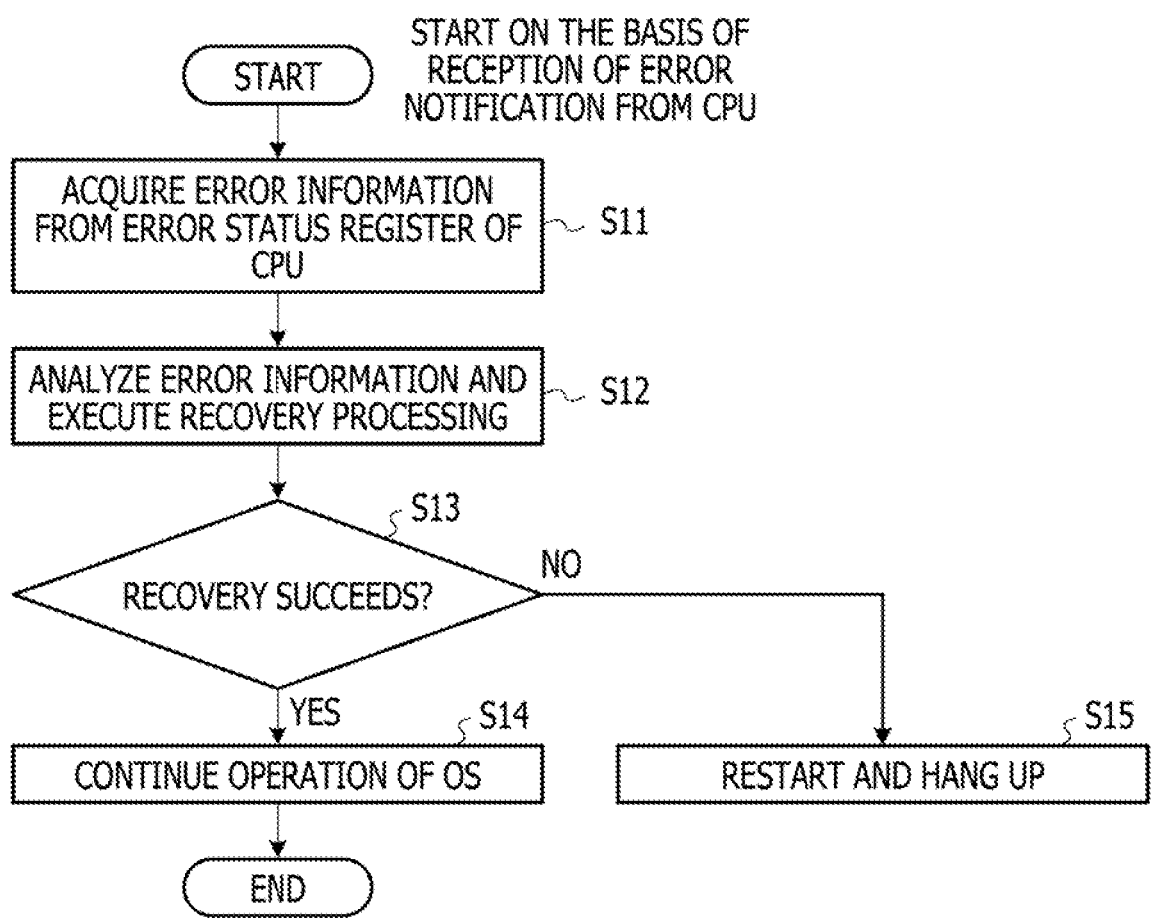
FIG. 5 is a flowchart illustrating an example of processing of a recovery processing unit of an OS in FIG. 4.

The OS processing unit 42 executes processing of the existing normal OS 41. In a case of receiving the error notification from the CPU 12, the recovery processing unit 44 analyzes an error of the CPU 12, the memory 14, or the like on the basis of content of an error status register of the CPU 12. Then, in a case where the recovery processing can be executed, the recovery processing unit 44 executes the recovery processing. An example of the processing of the recovery processing unit 44 executed by the OS 41 is illustrated in FIG. 5.

The active exchange processing unit 46 executes the active addition processing and the active deletion processing in cooperation with an active exchange processing unit 78 of firmware 71 and an active exchange processing unit 54 of a Basic Input Output System (BIOS) to be described later. For example, in a case where the active exchange processing unit 78 or the active exchange processing unit 54 interrupts the active addition processing of the CPU unit 10, the active exchange processing unit 46 performs setting so that the CPU 12 and the memory 14 of the CPU unit 10 on which the active addition is performed can be used.

Furthermore, in a case where the active exchange processing unit 78 or the active exchange processing unit 54 interrupts the active deletion processing of the CPU unit 10, the active exchange processing unit 46 performs setting so as not to use the CPU 12 and the memory 14 of the CPU unit 10 on which the active deletion is performed. For example, the interruption from the active exchange processing unit 78 or the active exchange processing unit 54 is issued to the CPU 12 that executes the OS 41 via the IO controller 30. The existence monitoring processing unit 48 regularly issues the existence monitoring notification to the firmware 71.

The ROM 50 stores a BIOS 51 that functions as a BIOS processing unit 52 and the active exchange processing unit 54. The BIOS 51 is executed by the CPU 12. Note that the CPU 12 may execute the BIOS 51 stored in the ROM 50 or may execute the BIOS 51 developed from the ROM 50 into the memory 14. The BIOS processing unit 52 executes processing of an existing normal BIOS. The active exchange processing unit 54 executes the active addition processing and the active deletion processing in cooperation with the active exchange processing unit 46 of the OS 41 on the basis of the instruction from the user who uses the information processing apparatus 100.

The server management device 60 includes the service processor 62, a memory 64, and a ROM 70. The service processor 62 is connected to each CPU 12 via a server management bus SMBUS. For example, the service processor 62 is a Baseboard Management Controller (BMC) and manages the CPU unit 10 or the like by executing the firmware 71 developed from the ROM 70 into the memory 64.

The ROM 70 stores the firmware 71 that realizes functions of a server management processing unit 72, an error analysis processing unit 74, an existence monitoring processing unit 76, and the active exchange processing unit 78. The ROM 70 is an example of a storage device. The server management processing unit 72, the error analysis processing unit 74, the existence monitoring processing unit 76, and the active exchange processing unit 78 are examples of a management unit. The error analysis processing unit 74 is an example of an error specification unit and an exchange determination unit.

The server management processing unit 72 executes normal processing of the server management device 60 such as control of a power supply of each CPU unit 10, acquisition of temperature information or the like, or recording of events.

Figure 6:
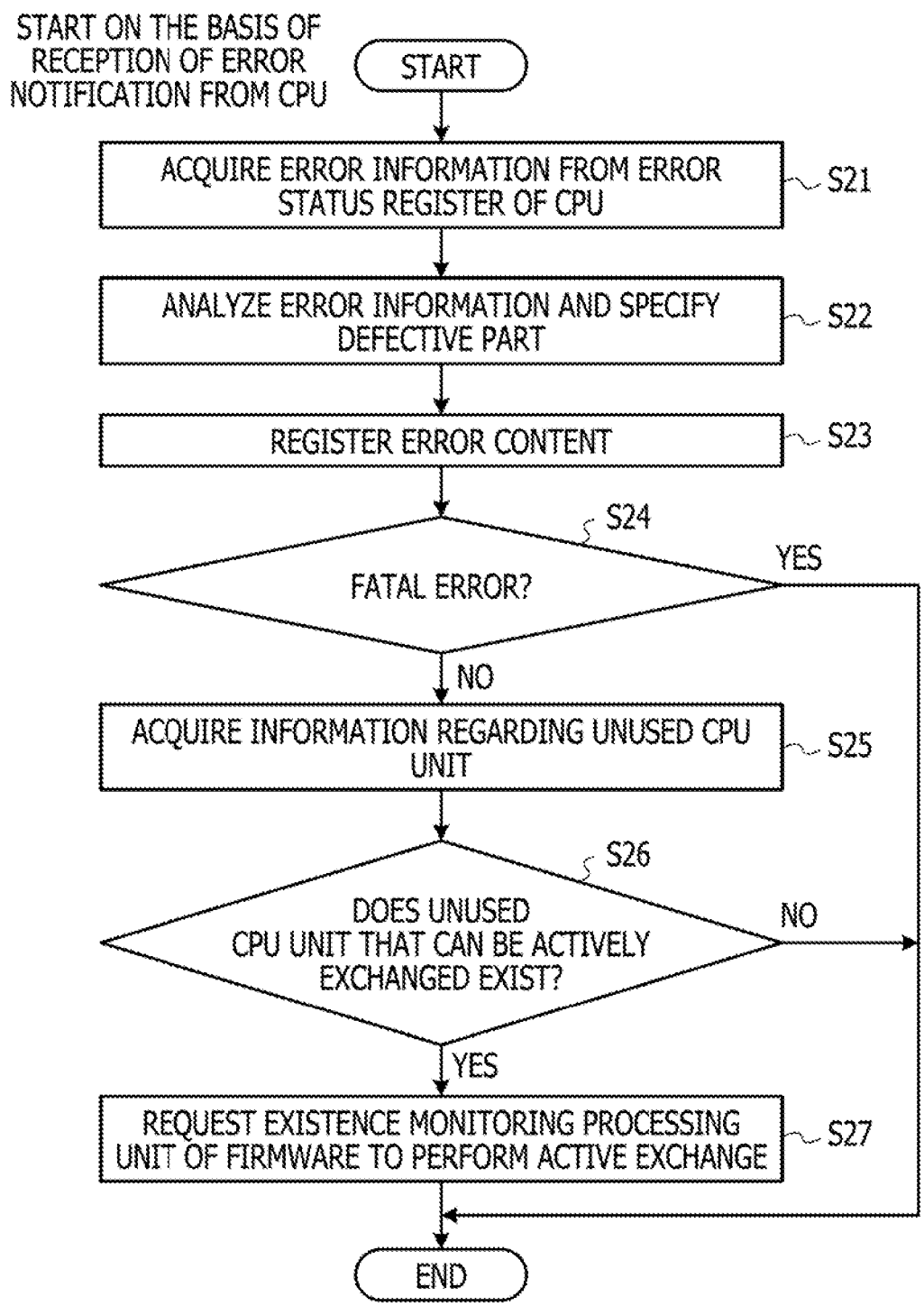
FIG. 6 is a flowchart illustrating an example of processing of an error analysis processing unit of firmware in FIG. 4.

In a case of receiving the error notification from the CPU 12, the error analysis processing unit 74 specifies the CPU unit 10 that has a failure by analyzing the error, and determines whether or not the active exchange can be performed. Furthermore, in a case where the active exchange can be performed, the error analysis processing unit 74 issues the request for active exchange to the existence monitoring processing unit 76. An example of the processing of the error analysis processing unit 74 is illustrated in FIG. 6.

Figure 7:
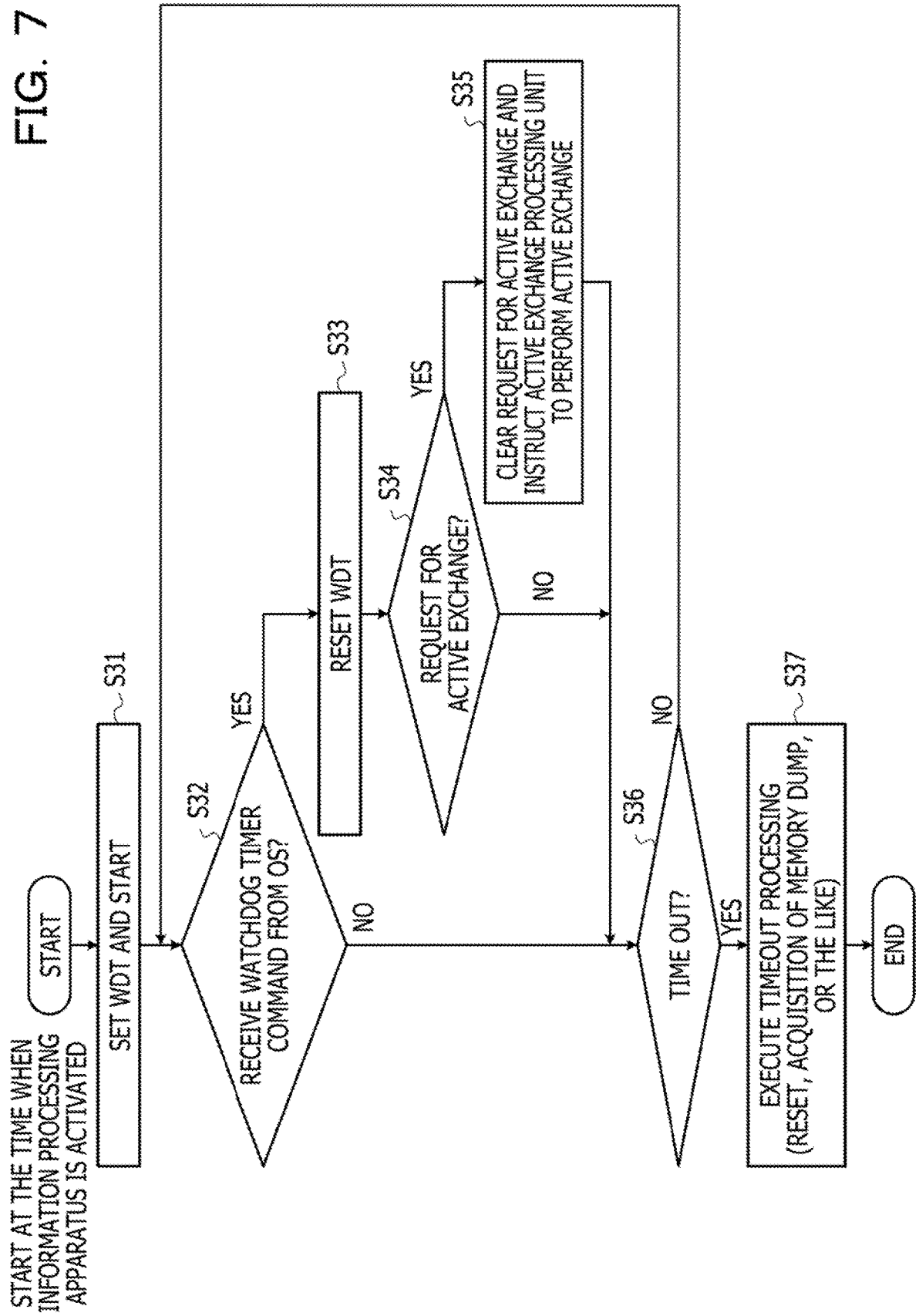
FIG. 7 is a flowchart illustrating an example of processing of an existence monitoring processing unit of the firmware in FIG. 4.

The existence monitoring processing unit 76 monitors existence of the OS 41, and in a case where it is not possible to confirm the existence of the OS 41 and timeout occurs, the existence monitoring processing unit 76 executes timeout processing. Furthermore, in a case where the active exchange can be performed on the basis of the request for active exchange from the error analysis processing unit 74, the existence monitoring processing unit 76 instructs the active exchange processing unit 78 to perform the active exchange. An example of the processing of the existence monitoring processing unit 76 is illustrated in FIG. 7.

The active exchange processing unit 78 executes active exchange processing in cooperation with the active exchange processing unit 46 of the OS 41 on the basis of the instruction to perform the active exchange from the existence monitoring processing unit 76. For example, by turning on the CPU unit 10 on which the active addition is performed and canceling the reset of the CPU 12 in the active addition processing of the CPU unit 10, the active exchange processing unit 78 starts an operation of the BIOS 51. The BIOS 51 that has started the operation initializes the CPU 12 and the memory 14.

Moreover, the active exchange processing unit 78 issues the interruption to the BIOS 51 executed by the CPU 12 of the CPU unit 10 that is in operation and makes the BIOS 51 initialize the CPU 12. As a result, the CPU 12 in operation and the CPU 12 of the CPU unit 10 to be actively added are mutually connected. Thereafter, the active exchange processing unit 78 issues the interruption to the OS 41 and sets the OS 41 to use the CPU 12 and the memory 14.

On the other hand, in the active deletion processing of the CPU unit 10, the active exchange processing unit 78 issues an interruption to the OS 41 and makes the OS 41 not to use the CPU 12 and the memory 14 of the CPU unit 10 to be actively deleted. On the basis of the interruption to the OS 41, the BIOS 51 electrically interrupts connection between the CPU 12 of the CPU unit 10 to be actively deleted and the CPU 12 of the CPU unit 10 in operation and interrupts the power supply of the CPU unit 10 to be actively deleted. With this operation, the CPU unit 10 is actively deleted.

FIG. 5 illustrates an example of processing of the recovery processing unit 44 of the OS 41 in FIG. 4. The processing illustrated in FIG. 5 is started on the basis of the reception of the error notification by the OS 41 from the CPU 12. FIG. 5 illustrates an example of a control program by the OS 41 of the information processing apparatus 100A.

First, in step S11, in a case of receiving the error notification from the CPU 12, the recovery processing unit 44 acquires the error information from the error status register of the CPU 12 that has issued the error notification. Next, in step S12, the recovery processing unit 44 analyzes content of an error occurred in the CPU 12, the memory 14, or the like on the basis of the acquired error information, and in a case where the CPU unit 10 can be recovered, the recovery processing unit 44 executes the recovery processing.

Next, in step S13, in a case where the recovery processing is successfully executed, the recovery processing unit 44 proceeds the processing to step S14. In a case where the recovery processing fails, the recovery processing unit 44 proceeds the processing to step S15. In step S14, the recovery processing unit 44 makes the OS processing unit 42 continue a normal operation of the OS 41 and terminates the processing. Note that the normal operation of the OS 41 includes periodical issuance processing of the existence monitoring notifications. The existence monitoring notification may be issued by a watchdog timer command.

In step S15, the recovery processing unit 44 executes restart processing of the CPU unit 10. In a case where the CPU unit 10 is not restarted, the OS 41 hangs up. In a case where the OS 41 hangs up, the issuance of the existence monitoring notification is stopped.

Note that, in a server in which a general-purpose CPU is mounted, even when an error occurs in the CPU and the memory, if the recovery processing by the OS is successfully executed, it is possible to continuously operate the apparatus without stopping the information processing apparatus. However, in a part in which an error occurs, there is a possibility that the similar error occurs again such as an intermittent failure of hardware or the like. Therefore, after the occurrence of the error, even when the recovery processing by the OS is successfully executed and the operation of the OS can be continued, if the information processing apparatus is continuously used, there is a case where the similar error occurs again.

Therefore, even in a case where the recovery processing by the OS is successfully executed on the basis of the error of the part, it is not preferable that the part in which the error has occurred be continuously operated, from the viewpoint of a stable operation of the information processing apparatus. In the present embodiment, by executing processing for actively deleting the CPU unit 10 mounting the part in which the error has occurred and for actively adding the other CPU unit 10 after the recovery processing by the OS is successfully executed, it is possible to suppress re-occurrence of an error in advance.

For example, in the information processing apparatus, in which the general-purpose CPU is mounted, before the present embodiment is applied, the firmware of the server management device does not determine whether or not the OS has succeeded the error recovery processing. Therefore, it is difficult to perform the active deletion and the active addition of the CPU unit 10 on the basis of the success of the recovery processing. The active deletion and the active addition of the CPU unit 10 based on the success of the recovery processing can be executed by adding new functions to the OS and the firmware of the server management device.

However, in a case where it is not possible to obtain cooperation of an OS vendor, it is difficult for a vendor of the information processing apparatus and an OS vendor, in cooperation with each other, to implement functions to execute the active deletion and the active addition of the CPU unit 10 on the basis of the success of the recovery processing. Therefore, in the information processing apparatus, in which a general-purpose CPU is mounted, before the present embodiment is applied, at the time when an error occurs, an operator of the information processing apparatus manually confirms the error information and confirms a condition or the like of the information processing apparatus after the error has occurred. Then, it is manually determined whether or not to perform the active deletion and the active addition and whether or not the active deletion and the active addition can be performed, and the active deletion and the active addition are manually performed.

On the other hand, in the present embodiment, as described with reference to FIGS. 6 and 7, the active deletion and the active addition can be automatically performed, without a manual operation, on the CPU unit 10 including the CPU 12 and the memory 14 in which the error has occurred without changing and adding the function of the OS 41. For example, the information processing apparatus 100A can realize the function for automatically and actively deleting and adding the CPU unit 10 without cooperating with the OS vendor. Moreover, if an OS has an existence monitoring notification function, the function according to the present embodiment can be realized regardless of the OS.

By performing the active exchange on the CPU unit 10 including the CPU 12 and the memory 14 in which an error has occurred, the operation of the information processing apparatus 100A can be continued without reducing resources (CPU 12, memory 14, or the like) of the information processing apparatus 100A. Furthermore, by electrically deleting the CPU unit 10 in which the error has occurred from the information processing apparatus 100, it is possible to exchange the CPU unit 10 or a defective part mounted on the CPU unit 10 while continuing the operation of the information processing apparatus 100A.

FIG. 6 illustrates an example of processing of the error analysis processing unit 74 of the firmware 71 in FIG. 4. The processing illustrated in FIG. 6 is started by the error analysis processing unit 74 in response to the reception of the error notification from the CPU 12. FIG. 5 illustrates an example of a control program executed by the firmware 71 of the information processing apparatus 100A.

First, in step S21, in a case of receiving the error notification from the CPU 12, the error analysis processing unit 74 acquires the error information from the error status register of the CPU 12 that has issued the error notification. Next, in step S22, the error analysis processing unit 74 specifies a defective CPU unit 10 to be actively exchanged by analyzing the acquired error information and specifying the defective part (CPU 12, memory 14, or the like). The defective CPU unit 10 is an example of an error component.

Next, in step S23, the error analysis processing unit 74 registers the analyzed error content in an internal log that is not opened to a user of the information processing apparatus 100A or a system event log (SEL) notified to a user.

Next, in step S24, the error analysis processing unit 74 determines whether or not the error notification indicates a fatal error that is not resolved by the active exchange of the component 1. For example, in a case where the error occurred in the CPU unit 10 is an error is an error that occurs again during the active exchange of the CPU unit 10 such as an error of a power supply or a clock, or the like, the error analysis processing unit 74 determines that the error is a fatal error. In a case of determining that the error is a fatal error, the error analysis processing unit 74 terminates the processing. In a case of determining that the error is not a fatal error, the error analysis processing unit 74 proceeds the processing to step S25.

In step S25, the error analysis processing unit 74 refers to a configuration management table or the like of the CPU unit 10 mounted on the information processing apparatus 100 and acquires information regarding the CPU unit 10 that is not used. For example, the configuration management table or the like is held in the memory 64, and a configuration and specifications (performance, storage capacity, or the like) of the component such as the CPU 12 mounted in the CPU unit 10 are held.

Next, in step S26, the error analysis processing unit 74 determines whether or not the active exchange can be performed according to the CPU unit 10 that is not used and of which the information is acquired in step S25. For example, the error analysis processing unit 74 determines whether or not there is a CPU unit 10 that is not used and has a configuration and specifications equivalent to those of the CPU unit 10 that is actively deleted due to occurrence of a failure. For the active exchange, it is preferable that at least the types of the CPUs 12 be the same. In a case where the active exchange can be performed, the error analysis processing unit 74 proceeds the processing to step S27. In a case where it is difficult to perform the active exchange, the error analysis processing unit 74 terminates the processing.

In step S27, the error analysis processing unit 74 requests the existence monitoring processing unit 76 to perform the active exchange and terminates the processing. For example, the error analysis processing unit 74 requests the existence monitoring processing unit 76 to actively delete the defective CPU unit 10 and actively add the other CPU unit 10 that can be exchanged. Note that an error analysis processing unit of an information processing apparatus that does not have a function for automatically performing active exchange of the CPU unit 10 does not have the function for executing steps S24 to S27.

FIG. 7 illustrates an example of processing of the existence monitoring processing unit 76 of the firmware 71 in FIG. 4. The processing illustrated in FIG. 7 is started when the information processing apparatus 100A is activated. FIG. 7 illustrates an example of a control program executed by the firmware 71 of the information processing apparatus 100A. In the example illustrated in FIG. 7, the existence monitoring processing unit 76 monitors the existence of the OS 41 by using a watchdog timer WDT (not illustrated).

First, in step S31, the existence monitoring processing unit 76 sets a time of the watchdog timer WDT and starts the watchdog timer WDT. Next, in step S32, in a case where a watchdog timer command is received from the OS 41, the existence monitoring processing unit 76 proceeds the processing to step S33, and in a case where the watchdog timer command is not received from the OS 41, the existence monitoring processing unit 76 proceeds the processing to step S36. The watchdog timer command is an example of a timer reset command and indicates that the OS 41 is operating.

For example, in a case where the OS 41 executes the recovery processing on the basis of the error notification received from the CPU 12 that has detected an error and the recovery processing is successfully executed, the OS 41 regularly issues the watchdog timer command. On the other hand, since the OS 41 repeats to restart or hangs up in a case where the recovery processing fails, the OS 41 does not issue the watchdog timer command. Therefore, the existence monitoring processing unit 76 can detect the success of the recovery processing according to the reception of the watchdog timer command by using the existence monitoring function of the OS 41 according to the watchdog timer WDT. For example, by using the existing existence monitoring function of the OS 41, the existence monitoring processing unit 76 can detect that the OS 41 is in a state where the OS 41 can execute the active exchange processing, without modifying the OS 41.

In step S33, the existence monitoring processing unit 76 resets the watchdog timer WDT. Next, in step S34, in a case where the request for active exchange is issued from the error analysis processing unit 74, the existence monitoring processing unit 76 proceeds the processing to step S35, and in a case where no request for active exchange is issued from the error analysis processing unit 74, the existence monitoring processing unit 76 proceeds the processing to step S36.

In step S35 the existence monitoring processing unit 76 clears the request for active exchange, instructs the active exchange processing unit 78 to perform the active exchange, and proceeds the processing to step S36. For example, the existence monitoring processing unit 76 issues the instructions to execute the active deletion processing of the defective CPU unit 10 and the active addition processing of the other CPU unit 10 that can be exchanged, to the active exchange processing unit 78.

In step S36, in a case where the watchdog timer WDT times out, the existence monitoring processing unit 76 proceeds the processing to step S37, and in a case where the watchdog timer WDT does not time out, the existence monitoring processing unit 76 returns the processing to step S32. Accordingly, while the OS 41 exists, the existence monitoring processing unit 76 can detect whether or not the request for active exchange is issued at a predetermined interval by using the function of the watchdog timer WDT.

In step S37, the existence monitoring processing unit 76 executes the timeout processing and terminates the processing. For example, the existence monitoring processing unit 76 resets the CPU unit 10 that causes the time-out or acquires a memory dump.

Note that an existence monitoring processing unit of an information processing apparatus that does not have a function for automatically performing the active exchange of the CPU unit 10 does not have the function for executing steps S34 and S35. Therefore, after the watchdog timer WDT is reset in step S33, the processing proceeds to step S36. Therefore, whether or not the recovery processing of the OS has been successfully executed on the basis of the error notification from the CPU 12 is determined by a function other than the existence monitoring function. For example, in a case where the OS is modified and the success or the failure of the recovery processing is notified from the OS to the BIOS, the vendor of the information processing apparatus and the vendor of the OS modify the BIOS and the OS in cooperation with each other. Therefore, in a case where it is not possible to cooperate with the vendor of the OS, it is difficult to realize the function for automatically performing the active exchange.

As described above, in the embodiment illustrated in FIGS. 4 to 7, similar effects to those in the embodiment illustrated in FIGS. 1 to 3 can be obtained. For example, it is possible for the firmware 71 to determine whether or not the active exchange can be performed on the basis of the failure of any one of the CPU units 10 and to automatically perform the active exchange. Furthermore, it is determined whether or not the error occurs again during the active exchange, and in a case where it is determined that the error occurs again, it is possible to suppress the execution of the active exchange. By acquiring CPU information of the CPU unit 10 that is not used via the server management bus SMBUS, the CPU unit 10 that has a failure can be actively exchanged with the CPU unit 10 having equivalent performance.

Moreover, in the present embodiment, while the OS 41 exists, the existence monitoring processing unit 76 can detect whether or not the request for active exchange is issued at a predetermined interval by using the function of the watchdog timer WDT. Furthermore, the existence monitoring processing unit 76 can detect the success of the recovery processing according to the reception of the watchdog timer command by using the existence monitoring function of the OS 41 according to the watchdog timer WDT. For example, by using the existing existence monitoring function of the OS 41, the existence monitoring processing unit 76 can detect that the OS 41 is in a state where the OS 41 can execute the active exchange processing, without modifying the OS 41.

Figure 8:
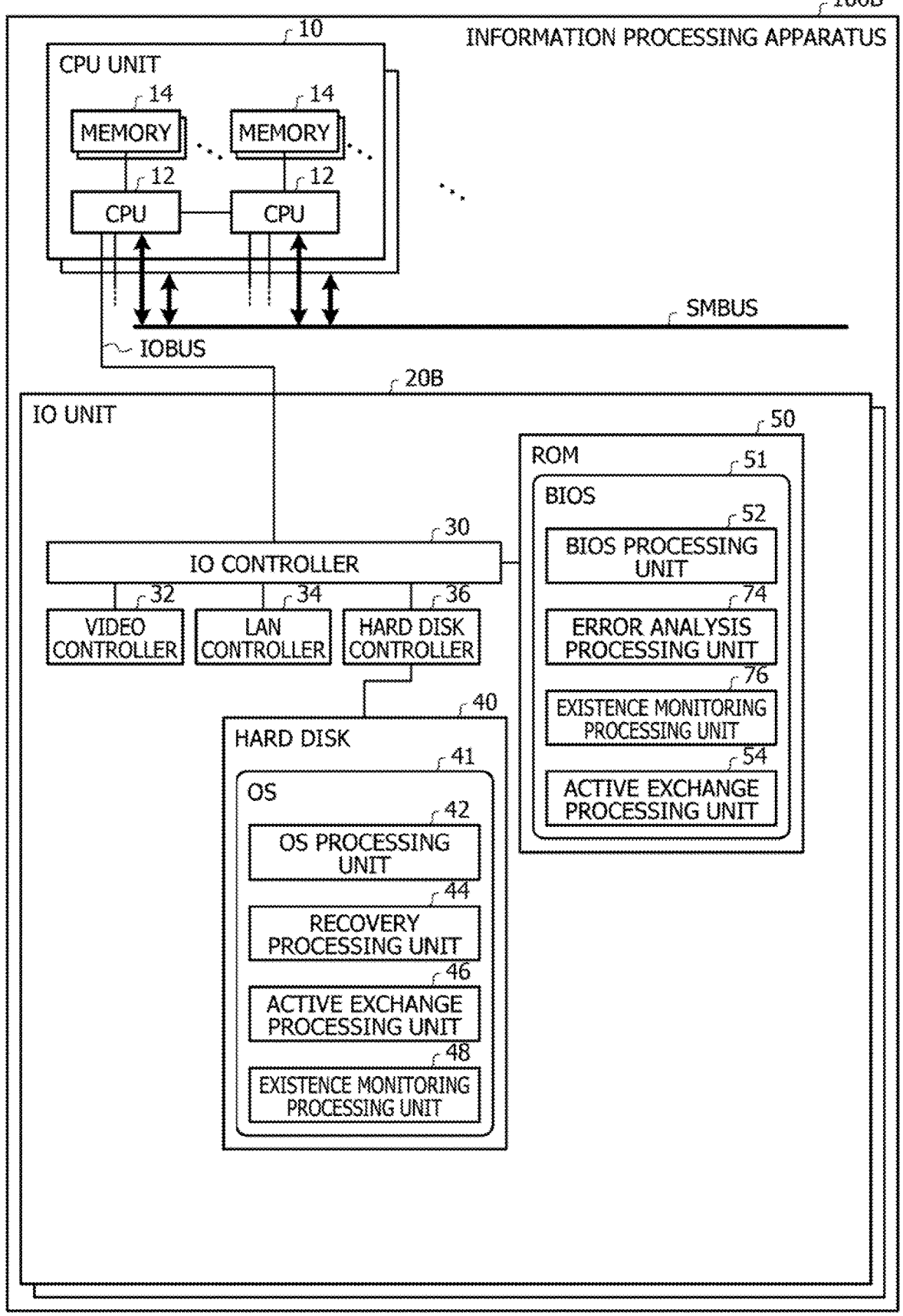
FIG. 8 is a block diagram illustrating an example of an information processing apparatus according to still another embodiment.

FIG. 8 illustrates an example of an information processing apparatus 100B according to still another embodiment. Elements similar to those in FIG. 4 are denoted by the same reference numerals, and detailed description is omitted. For example, the information processing apparatus 100B illustrated in FIG. 8 is a server in which a general-purpose CPU is mounted.

The information processing apparatus 100B according to the present embodiment includes an IO unit 20B instead of the IO unit 20 in FIG. 4. The IO unit 20B does not include the server management device 60 illustrated in FIG. 4, and functions of an error analysis processing unit 74 and an existence monitoring processing unit 76 are realized by a BIOS 51 stored in a ROM 50. In other words, the functions of the error analysis processing unit 74 and the existence monitoring processing unit 76 are realized by the BIOS 51 executed by a CPU 12. Furthermore, the BIOS 51 includes a BIOS processing unit 52 and an active exchange processing unit 54 similarly to the BIOS 51 illustrated in FIG. 4. However, the active exchange processing unit 54 has a function similar to that of the active exchange processing unit 78 of the firmware 71 in FIG. 4.

Operations for automatically performing active exchange by the information processing apparatus 100B on the basis of the reception of the error notification from the CPU 12 are similar to the operations illustrated in FIGS. 6 and 7 except that the operation is performed by the BIOS 51.

As described above, in the embodiment illustrated in FIG. 8, the function of the firmware 71 illustrated in FIG. 4 is realized by the BIOS 51. Therefore, as in the embodiments indicated in FIGS. 1 to 7, it is possible that the BIOS 51 automatically determines whether or not the active exchange can be performed on the basis of the failure of any one of the CPU units 10 and automatically perform the active exchange.

Moreover, in the present embodiment, it is possible to automatically perform the active exchange without providing the server management device 60 illustrated in FIG. 4 in the IO unit 206. As a result, the configuration of the IO unit 206 can be more simplified than the configuration of the IO unit 20 illustrated in FIG. 4, and cost of the information processing apparatus 1009 can be reduced.

Figure 9:
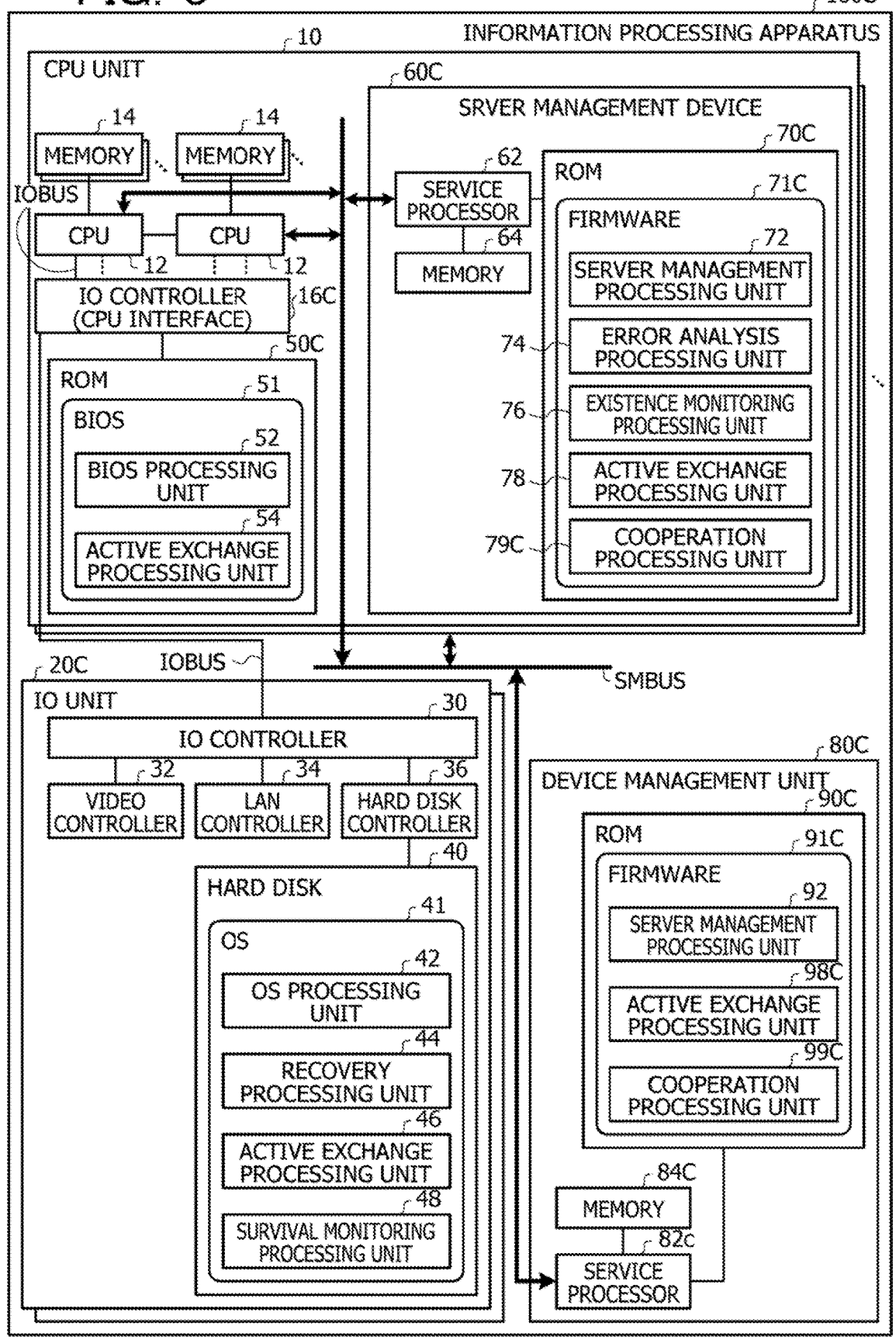
FIG. 9 is a block diagram illustrating an example of an information processing apparatus according to yet another embodiment.

FIG. 9 illustrates an example of an information processing apparatus 100C according to yet another embodiment. Elements similar to those in FIG. 4 are denoted by the same reference numerals, and detailed description is omitted. For example, the information processing apparatus 100C illustrated in FIG. 9 is a server in which a general-purpose CPU is mounted.

The information processing apparatus 100C according to the present embodiment includes a plurality of CPU units 10C instead of the plurality of CPU units 10 illustrated in FIG. 4, and includes an IO unit 20C instead of the IO unit 20 illustrated in FIG. 4. Furthermore, the information processing apparatus 100C includes a device management unit 80C instead of the server management device 60 illustrated in FIG. 4.

Each CPU unit 10C includes an IO controller 16C (CPU interface) between the CPU 12 and an IO controller 30. For example, the CPU unit 10C has a form of a system substrate. The IO controller 16C is connected to each CPU 12 via an input and output bus IOBUS on the side of the CPU 12 and is connected to the IO controller 30 via an input and output bus IOBUS on the side of the IO unit 20C.

A ROM 50C is connected to each CPU 12 via the IO controller 16C. The ROM 50C stores a BIOS 51 similarly to the ROM 50 in FIG. 4. Furthermore, each CPU unit 10C includes a server management unit 60C connected to a server management bus SMBUS.

The information processing apparatus 100C according to the present embodiment includes the server management unit 60C that executes active exchange processing, in addition to the device management unit 80C that manages the information processing apparatus 100C. Then, the IO controller 16C that realizes a part of the function of the IO controller 30, the ROM 50C that stores the BIOS 51, and the server management unit 60C are mounted in each CPU unit 10C. The active exchange processing of the CPU unit 10 is executed by the server management unit 60C of any CPU unit 10C (master). The server management unit 60C of each CPU unit 10C is an example of a management unit.

The server management unit 60C includes a service processor 62, a memory 64, and a ROM 70C similarly to the server management device 60 illustrated in FIG. 4. Firmware 71C stored in the ROM 70C realizes functions of a server management processing unit 72, an error analysis processing unit 74, an existence monitoring processing unit 76, an active exchange processing unit 78, and a cooperation processing unit 79C. The cooperation processing unit 79C manages the information processing apparatus 100C in cooperation with the cooperation processing unit 79C of the firmware 71C of the server management unit 60C.

The functions of the server management processing unit 72, the error analysis processing unit 74, the existence monitoring processing unit 76, and the active exchange processing unit 78 are respectively the same as the functions of the server management processing unit 72, the error analysis processing unit 74, the existence monitoring processing unit 76, and the active exchange processing unit 78 illustrated in FIG. 4.

Therefore, the active exchange processing described with reference to FIGS. 6 and 7 is realized by the firmware 71C executed by the service processor 62 of the server management unit 60C of each CPU unit 10C. The active exchange processing is executed by the server management unit 60C of a master CPU unit 10C, which is set at the time of activating the information processing apparatus 100C, from among the plurality of CPU units 10C.

The device management unit 80C includes a service processor 82C, a memory 84C, and a ROM 90C. The service processor 82C is connected to each CPU 12 and each server management unit 60C via a server management bus SMBUS. For example, the service processor 82C is a BMC, and manages the CPU unit 10C or the like by executing firmware 91C developed from the ROM 90C to the memory 84C. The firmware 91C stored in the ROM 90C realizes functions of a server management processing unit 92, an active exchange processing unit 98C, and a cooperation processing unit 99C.

The IO unit 20C does not include the server management device 60 illustrated in FIG. 4, and the functions of the error analysis processing unit 74 and the existence monitoring processing unit 76 are realized by the firmware 71C stored in the ROM 70C. In other words, the functions of the error analysis processing unit 74 and the existence monitoring processing unit 76 are realized by the firmware 71C executed by the service processor 62.

The BIOS 51 includes a BIOS processing unit 52 and an active exchange processing unit 54 similarly to the BIOS in FIG. 4. However, the active exchange processing unit 54 has a function similar to that of the active exchange processing unit 78 of the firmware 71 in FIG. 4.

As described above, in the embodiment illustrated in FIG. 9, the function of the firmware 71 illustrated in FIG. 4 is realized by any one of the firmware 71C of the server management unit 60C mounted in each CPU unit 10C. Therefore, as in the embodiments indicated in FIGS. 1 to 7, it is possible that the BIOS 51 automatically determines whether or not the active exchange can be performed on the basis of the failure of any one of the CPU units 10C and automatically perform the active exchange.

Moreover, in the present embodiment, it is possible to automatically perform the active exchange without providing the server management device 60 illustrated in FIG. 4 in the IO unit 20C. As a result, the configuration of the IO unit 20C can be more simplified than the configuration of the IO unit 20 illustrated in FIG. 4, and cost of the information processing apparatus 100B can be reduced.

From the above detailed description, characteristics and advantages of the embodiments will become apparent. This is intended to cover the features and advantages of the embodiments described above without departing from the spirit and the scope of the claims. Furthermore, any person having ordinary knowledge in the technical field can be easily come up with various improvements and modifications. Therefore, there is no intention to limit the scope of the inventive embodiments to those described above, and the scope of the inventive embodiments can rely on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
 a plurality of components, each of the plurality of components including a processor, the processor being configured to output an error notification in response to detecting an error; and
 a management circuit coupled to the plurality of components, the management circuit being configured to execute an error specification processing when the error notification is received from an error detected processor which has detected an error occurred, the error detected processor being the processor included in any of the plurality of components, the error specification processing including specifying an error component by analyzing error information obtained from the error detected processor, the error component being any of the plurality of components and including a part that causes an error, execute an exchange determination processing that includes issuing a request for active exchange when another component exists from among the plurality of components, the other component being a component able to be actively exchanged with the error component, execute an existence monitoring processing that includes monitoring whether or not an operating system executed by the information processing apparatus is alive, and issuing instructions in response to detecting that the operating system is alive after the issuing of the request for active exchange, the instructions including a deletion instruction and an addition instruction, the deletion instruction being configured to execute active deletion processing of the error component, the addition instruction being configured to execute active addition processing of the other component, and execute an active exchange processing that includes initiating the active deletion processing in response to the deletion instruction issued from the existence monitoring processing, and initiating the active addition processing in response to the active addition instruction issued from the existence monitoring processing.

2. The information processing apparatus according to claim 1,
wherein the exchange determination processing is configured to, when it is determined that an error occurs again during the active exchange, refrain from the issuing of the request for active exchange even when the other component that is able to be actively exchanged with the error component exists.

3. The information processing apparatus according to claim 1,
wherein the existence monitoring processing is configured to, during no detection that the operating system is alive, prevent from the issuing of the instructions even when the request for active exchange has been issued.

4. The information processing apparatus according to claim 1,
wherein the existence monitoring processing is configured to
recognize the alive operating system by an occurrence a timer associated with the alive operating system is reset in response to a timer reset command, the timer reset command being a command periodically issued from the alive operating system,
issue the instructions in response to the resetting of the timer associated with the alive operating system after when the request for active exchange has been issued.

5. The information processing apparatus according to a claim 1,
wherein the exchange determination processing is configured to
obtain specification information via a management bus that couples the management circuit with the plurality of components, the specification information including first specification information and second specification information, the first specification information indicating information on the processor included in the unused component from among the plurality of components, the second specification information indicating information on the processor included in the error component from among the plurality of components,
determine whether or not active exchange is able to be performed on a basis of comparison between the first specification information and the second specification information.

6. The information processing apparatus according to claim 1,
wherein the management circuit includes a management processor coupled to the processor included in each of the plurality of components via a management bus,
wherein the management processor is configured to execute the error specification processing, the exchange determination processing, the existence monitoring processing, and the active exchange processing.

7. The information processing apparatus according to claim 6,
wherein the management processor is mounted in each of the plurality of components, and
the management circuit is realized by any one of the management processors respectively mounted in the plurality of components.

8. The information processing apparatus according to claim 1, further comprising
an input and output circuit coupled to the processor included in each of the plurality of components via an input and output bus, the input and output circuit including a predetermined number of interfaces and a storage device, the storage device being configured to store firmware to be executed by the processor included in each of the plurality of components,
the management circuit is realized by the firmware executed by the processor included in any of the plurality of components.

9. A non-transitory computer-readable storage medium for storing a control program which causes a computer to perform processing, the computer including a plurality of components and a management circuit, each of the plurality of components including a processor configured to output an error notification in response to detecting an error, the management circuit being configured to perform the processing, the processing comprising:

executing an error specification processing when the error notification is received from an error detected processor which has detected an error occurred, the error detected processor being the processor included in any of the plurality of components, the error specification processing including specifying an error component by analyzing error information obtained from the error detected processor, the error component being any of the plurality of components and including a part that causes an error;

executing an exchange determination processing that includes issuing a request for active exchange when another component exists from among the plurality of components, the other component being a component able to be actively exchanged with the error component;

executing an existence monitoring processing that includes
monitoring whether or not an operating system executed by the information processing apparatus is alive, and
issuing instructions in response to detecting that the operating system is alive after the issuing of the request for active exchange, the instructions including a deletion instruction and an addition instruction, the deletion instruction being configured to execute active deletion processing of the error component, the addition instruction being configured to execute active addition processing of the other component; and executing an active exchange processing that includes
initiating the active deletion processing in response to the deletion instruction issued from the existence monitoring processing, and
initiating the active addition processing in response to the active addition instruction issued from the existence monitoring processing.

10. The non-transitory computer-readable storage medium according to claim 9,
wherein the exchange determination processing is configured to, when it is determined that an error occurs again during the active exchange, refrain from the issuing of the request for active exchange even when the other component that is able to be actively exchanged with the error component exists.

11. The non-transitory computer-readable storage medium according to claim 9,
wherein the existence monitoring processing is configured to, during no detection that the operating system is alive, prevent from the issuing of the instructions even when the request for active exchange has been issued.

12. The non-transitory computer-readable storage medium according to claim 9,
wherein the existence monitoring processing is configured to
recognize the alive operating system by an occurrence a timer associated with the alive operating system is reset in response to a timer reset command, the timer reset command being a command periodically issued from the alive operating system,
issue the instructions in response to the resetting of the timer associated with the alive operating system after when the request for active exchange has been issued.

13. The non-transitory computer-readable storage medium according to a claim 9,
wherein the exchange determination processing is configured to
obtain specification information via a management bus that couples the management circuit with the plurality of components, the specification information including first specification information and second specification information, the first specification information indicating information on the processor included in the unused component from among the plurality of components, the second specification information indicating information on the processor included in the error component from among the plurality of components, determine whether or not active exchange is able to be performed on a basis of comparison between the first specification information and the second specification information.

14. The non-transitory computer-readable storage medium according to claim 9,
wherein the management circuit includes a management processor coupled to the processor included in each of the plurality of components via a management bus,
wherein the management processor is configured to execute the error specification processing, the exchange determination processing, the existence monitoring processing, and the active exchange processing.

15. The non-transitory computer-readable storage medium according to claim 4,
wherein the management processor is mounted in each of the plurality of components, and
the management circuit is realized by any one of the management processors respectively mounted in the plurality of components.

16. The non-transitory computer-readable storage medium according to claim 9, the processing further comprising:
an input and output circuit coupled to the processor included in each of the plurality of components via an input and output bus, the input and output circuit including a predetermined number of interfaces and a storage device, the storage device being configured to store firmware to be executed by the processor included in each of the plurality of components,
the management circuit is realized by the firmware executed by the processor included in any of the plurality of components.

17. A method implemented by a computer, the computer including a plurality of components and a management circuit, each of the plurality of components including a processor configured to output an error notification in response to detecting an error, the management circuit being configured to perform the method, the method comprising:
executing an error specification processing when the error notification is received from an error detected processor which has detected an error occurred, the error detected processor being the processor included in any of the plurality of components, the error specification processing including specifying an error component by analyzing error information obtained from the error detected processor, the error component being any of the plurality of components and including a part that causes an error;
executing an exchange determination processing that includes issuing a request for active exchange when another component exists from among the plurality of components, the other component being a component able to be actively exchanged with the error component;
executing an existence monitoring processing that includes
monitoring whether an operating system executed by the information processing apparatus is alive, and
issuing instructions in response to detecting that the operating system is alive after the issuing of the request for active exchange, the instructions including a deletion instruction and an addition instruction, the deletion instruction being configured to execute active deletion processing of the error component, the addition instruction being configured to execute active addition processing of the other component; and executing an active exchange processing that includes
   initiating the active deletion processing in response to the deletion instruction issued from the existence monitoring processing, and
   initiating the active addition processing in response to the active addition instruction issued from the existence monitoring processing.

* * * * *